US012263394B2

(12) United States Patent
Bayerlein et al.

(10) Patent No.: US 12,263,394 B2
(45) Date of Patent: *Apr. 1, 2025

(54) LIGHTING SYSTEM AND METHOD OF USING SAME WITH EXERCISE AND REHABILITATION EQUIPMENT

(71) Applicant: Woodway USA, Inc., Waukesha, WI (US)

(72) Inventors: Douglas G. Bayerlein, Oconomowoc, WI (US); Nicholas A. Oblamski, Waukesha, WI (US); Derek T. Jordan, Waukesha, WI (US); Joseph W. Martin, Pewaukee, WI (US)

(73) Assignee: Woodway USA, Inc., Waukesha, WI (US)

( * ) Notice: Subject to any disclaimer, the term of this patent is extended or adjusted under 35 U.S.C. 154(b) by 88 days.

This patent is subject to a terminal disclaimer.

(21) Appl. No.: 18/094,853

(22) Filed: Jan. 9, 2023

(65) Prior Publication Data

US 2023/0158392 A1 May 25, 2023

Related U.S. Application Data

(63) Continuation of application No. 17/080,385, filed on Oct. 26, 2020, now Pat. No. 11,547,921, which is a (Continued)

(51) Int. Cl.
*A63B 71/06* (2006.01)
*A63B 21/00* (2006.01)
(Continued)

(52) U.S. Cl.
CPC ...... *A63B 71/0622* (2013.01); *A63B 21/4035* (2015.10); *A63B 22/02* (2013.01);
(Continued)

(58) Field of Classification Search
CPC ............ A63B 21/4033; A63B 21/4034; A63B 21/4035; A63B 22/02; A63B 24/0059;
(Continued)

(56) References Cited

U.S. PATENT DOCUMENTS 4,416,293 A 11/1983 Anderson et al.
6,554,749 B2 4/2003 Iund et al.
(Continued)

FOREIGN PATENT DOCUMENTS

DE 20 2013 100 464 U1 3/2013
KR 1852748 B1 6/2018

OTHER PUBLICATIONS

Technogym, "Excite Engaging Cardio", Jul. 2017, 132 pages.

*Primary Examiner* — Gary D Urbiel Goldner
(74) *Attorney, Agent, or Firm* — Foley & Lardner LLP

(57) ABSTRACT

A treadmill includes a frame and a running belt coupled to the frame. The running belt is configured to rotate relative to the frame. The treadmill includes at least one sensor configured to collect information regarding a rotation of the running belt and a use of the treadmill by a user of the treadmill. The treadmill also includes a light source coupled to the frame and configured to emit a light at least partly away from a front of the treadmill to at least partly illuminate a rear of the treadmill.

19 Claims, 11 Drawing Sheets

Related U.S. Application Data continuation of application No. 16/023,762, filed on Jun. 29, 2018, now Pat. No. 10,816,177.

(60) Provisional application No. 62/622,490, filed on Jan. 26, 2018, provisional application No. 62/527,869, filed on Jun. 30, 2017.

(51) Int. Cl.

| | |
|---|---|
| ***A63B 22/02*** | (2006.01) |
| ***A63B 24/00*** | (2006.01) |
| *F21V 23/00* | (2015.01) |
| *F21V 23/04* | (2006.01) |

(52) U.S. Cl.

CPC ...... *A63B 24/0087* (2013.01); *A63B 71/0686* (2013.01); *A63B 2024/0068* (2013.01); *A63B 2071/0625* (2013.01); *A63B 2071/0658* (2013.01); *A63B 2220/17* (2013.01); *A63B 2220/18* (2013.01); *A63B 2220/22* (2013.01); *A63B 2220/30* (2013.01); *A63B 2220/51* (2013.01); *A63B 2220/62* (2013.01); *A63B 2220/72* (2013.01); *A63B 2225/682* (2013.01); *A63B 2225/74* (2020.08); *A63B 2230/045* (2013.01); *A63B 2230/755* (2013.01); *F21V 23/003* (2013.01); *F21V 23/0442* (2013.01)

(58) Field of Classification Search

CPC ............ A63B 24/0062; A63B 24/0075; A63B 24/0087; A63B 2024/0068; A63B 2024/0081; A63B 69/0028; A63B 69/0035; A63B 2069/0037; A63B 71/0054; A63B 71/0619; A63B 71/0622; A63B 71/0686; A63B 2071/0625; A63B 2071/0658; A63B 2071/0675; A63B 2071/0683; A63B 2071/0694; A63B 2220/10; A63B 2220/17; A63B 2220/18; A63B 2220/20; A63B 2220/22; A63B 2220/30; A63B 2220/36; A63B 2220/50; A63B 2220/51; A63B 2220/58; A63B 2220/62; A63B 2220/70; A63B 2220/72; A63B 2220/80; A63B 2220/805; A63B 2220/807; A63B 2220/83; A63B 2220/833; A63B 2225/50; A63B 2225/74; A63B 2230/04; A63B 2230/045; A63B 2230/06; A63B 2230/062; A63B 2230/065; A63B 2230/067; A63B 2230/75; A63B 2230/755

See application file for complete search history.

(56) References Cited

U.S. PATENT DOCUMENTS

| | | | | |
|---|---|---|---|---|
| 6,749,541 | B1 | 6/2004 | Martin | |
| 7,166,062 | B1 | 1/2007 | Watterson et al. | |
| 9,460,700 | B2 | 10/2016 | Smith | |
| 9,707,447 | B1 | 7/2017 | Lopez Babodilla et al. | |
| 10,272,317 | B2 | 4/2019 | Watterson | |
| 10,328,303 | B2 * | 6/2019 | Frank | A63B 71/0054 |
| 10,556,168 | B2 | 2/2020 | Fima | |
| 10,816,177 | B1 | 10/2020 | Bayerlein et al. | |
| 11,517,806 | B2 * | 12/2022 | Bayerlein | A63B 22/02 |
| 11,547,921 | B2 * | 1/2023 | Bayerlein | A63B 22/02 |
| 2005/0039541 | A1 | 2/2005 | Kurono | |
| 2005/0148443 | A1 | 7/2005 | Watterson et al. | |
| 2007/0255186 | A1 | 11/2007 | Grill | |
| 2007/0265138 | A1 | 11/2007 | Ashby | |
| 2008/0015088 | A1 | 1/2008 | Del Monaco | |
| 2008/0119337 | A1 | 5/2008 | Wilkins et al. | |
| 2008/0242511 | A1 | 10/2008 | Munoz et al. | |
| 2009/0176629 | A1 | 7/2009 | Yi | |
| 2009/0246746 | A1 | 10/2009 | Roerdink et al. | |
| 2010/0261579 | A1 | 10/2010 | Rice | |
| 2012/0108398 | A1 | 5/2012 | Lo | |
| 2013/0035215 | A1 | 2/2013 | Ashby et al. | |
| 2014/0256511 | A1 | 9/2014 | Smith | |
| 2015/0080181 | A1 | 3/2015 | Skulman | |
| 2015/0140534 | A1 | 5/2015 | Brunner | |
| 2015/0173652 | A1 | 6/2015 | Brunner | |
| 2015/0262459 | A1 | 9/2015 | Munro et al. | |
| 2015/0262470 | A1 | 9/2015 | Munro et al. | |
| 2015/0306456 | A1 | 10/2015 | Pasini et al. | |
| 2016/0213976 | A1 | 7/2016 | So et al. | |
| 2016/0258861 | A1 | 9/2016 | Kannel | |
| 2017/0080320 | A1 | 3/2017 | Smith | |
| 2017/0136289 | A1 | 5/2017 | Frank | |
| 2017/0209734 | A1 | 7/2017 | Huang | |
| 2017/0225038 | A1 | 8/2017 | Wei et al. | |
| 2017/0266534 | A1 | 9/2017 | Watterson | |
| 2017/0266535 | A1 | 9/2017 | Watterson | |
| 2017/0289738 | A1 | 10/2017 | Jepson et al. | |
| 2020/0171353 | A1 | 6/2020 | Fima | |
| 2020/0179789 | A1 | 6/2020 | Fima | |
| 2020/0188760 | A1 | 6/2020 | Bandini et al. | |
| 2020/0332990 | A1 | 10/2020 | Bayerlein et al. | |
| 2021/0041092 | A1 | 2/2021 | Bayerlein et al. | |

* cited by examiner

LIGHTING SYSTEM AND METHOD OF USING SAME WITH EXERCISE AND REHABILITATION EQUIPMENT

CROSS REFERENCE TO RELATED APPLICATIONS

This application is a continuation of U.S. patent application Ser. No. 17/080,385, filed Oct. 26, 2020, which is a continuation of U.S. patent application Ser. No. 16/023,762, filed Jun. 29, 2018, which claims the benefit of and priority to both of U.S. Provisional Patent Application 62/527,869, filed Jun. 30, 2017, and U.S. Provisional Patent Application 62/622,490 filed Jan. 26, 2018, all of which are incorporated herein by reference in their entireties.

TECHNICAL FIELD

The present disclosure relates to treadmills. More particularly, the present disclosure relates to a lighting system for treadmills and other exercise equipment.

BACKGROUND

Treadmills enable a person to walk, jog, or run for a relatively long distance in a limited space. Treadmills can be used for physical fitness, athlete training and therapeutic uses for the treatment of medical conditions. It should be noted that throughout this document, the term "run" and variations thereof (e.g., running, etc.) in any context is intended to include all substantially linear locomotion by a person. Examples of this linear locomotion include, but are not limited to, jogging, walking, skipping, scampering, sprinting, dashing, hopping, galloping, lane slides, side stepping, shuffling, etc. The bulk of the discussion herein is focused on training and physical fitness, but persons skilled in the art will understand that all of the structures and methods described herein are equally applicable in medical therapeutic applications.

A person running generates force to propel themselves in a desired direction. To simplify this discussion, the desired direction will be designated as the forward direction. As the person's feet contact the ground (or other surface), their muscles contract and extend to apply a force to the ground that is directed generally rearward (i.e., has a vector direction substantially opposite the direction they desire to move). Keeping with Newton's third law of motion, the ground resists this rearwardly directed force from the person, resulting in the person moving forward relative to the ground at a speed related to the force they are creating. While the prior discussion relates solely to movement in the forward direction, persons skilled in the art will understand that this can mean movement in any direction, for example side to side, backward/reverse, or any desired direction.

To counteract the force created by the treadmill user so that the user stays in a relatively static fore and aft position on the treadmill, a running belt of a treadmill is driven or rotated (e.g., by a motor). Thus, in operation, the running belt moves at substantially the same speed as the user, but in the opposite direction. In this way, the user remains in substantially the same relative position along the treadmill while running.

SUMMARY

One implementation of the present disclosure is a treadmill. The treadmill includes a frame. The frame includes a first side member, a second side member, and a cross-member coupled to and extending between the first side member and the second side member. The treadmill also includes a belt coupled to the frame and configured to rotate about the cross-member. The treadmill also includes a light source coupled to the first side member, the second side member, and the cross-member and a controller configured to control the light source.

Another implementation of the present disclosure is a method. The method includes providing a light source with a treadmill and operating the light source to illuminate the treadmill. The method also includes receiving data regarding a parameter relating to a use of the treadmill by a user and controlling the color or brightness of light emitted by the light source based on the data.

Another implementation of the present disclosure is a treadmill. The treadmill includes a frame, a running belt coupled to the frame, a handrail coupled to the frame, a console coupled to the handrails, and a sensor coupled to the frame, the handrails, or the console. The sensor is configured to detect a position of a user relative to a longitudinal center line of the running belt. The treadmill also includes a plurality of light sources distributed horizontally across the console and operable to indicate the position of the user relative to the center line of the running belt.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The accompanying drawings, which are incorporated and constitute a part of this specification, illustrate several embodiments that, together with the description, serve to explain the principles and features of the present disclosure.

DETAILED DESCRIPTION

Figure 1:
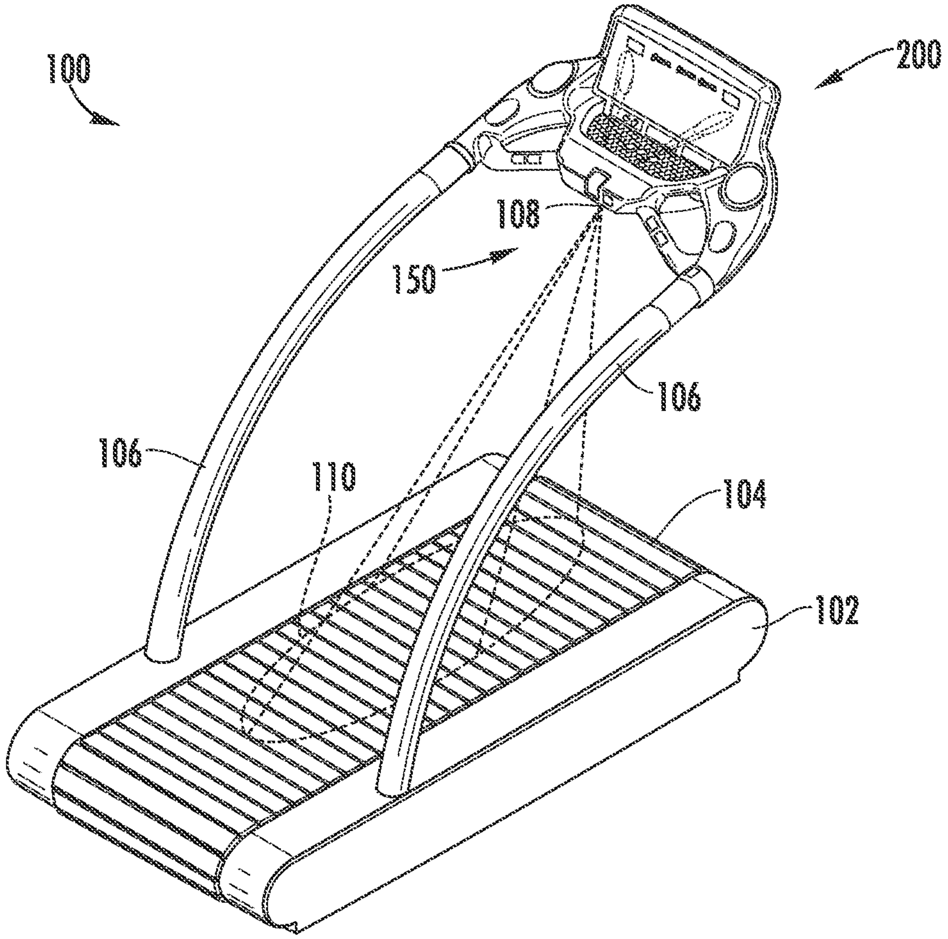
FIGS. 1-4 show various views of a treadmill with a lighting system, according to an exemplary embodiment.
Figure 2:
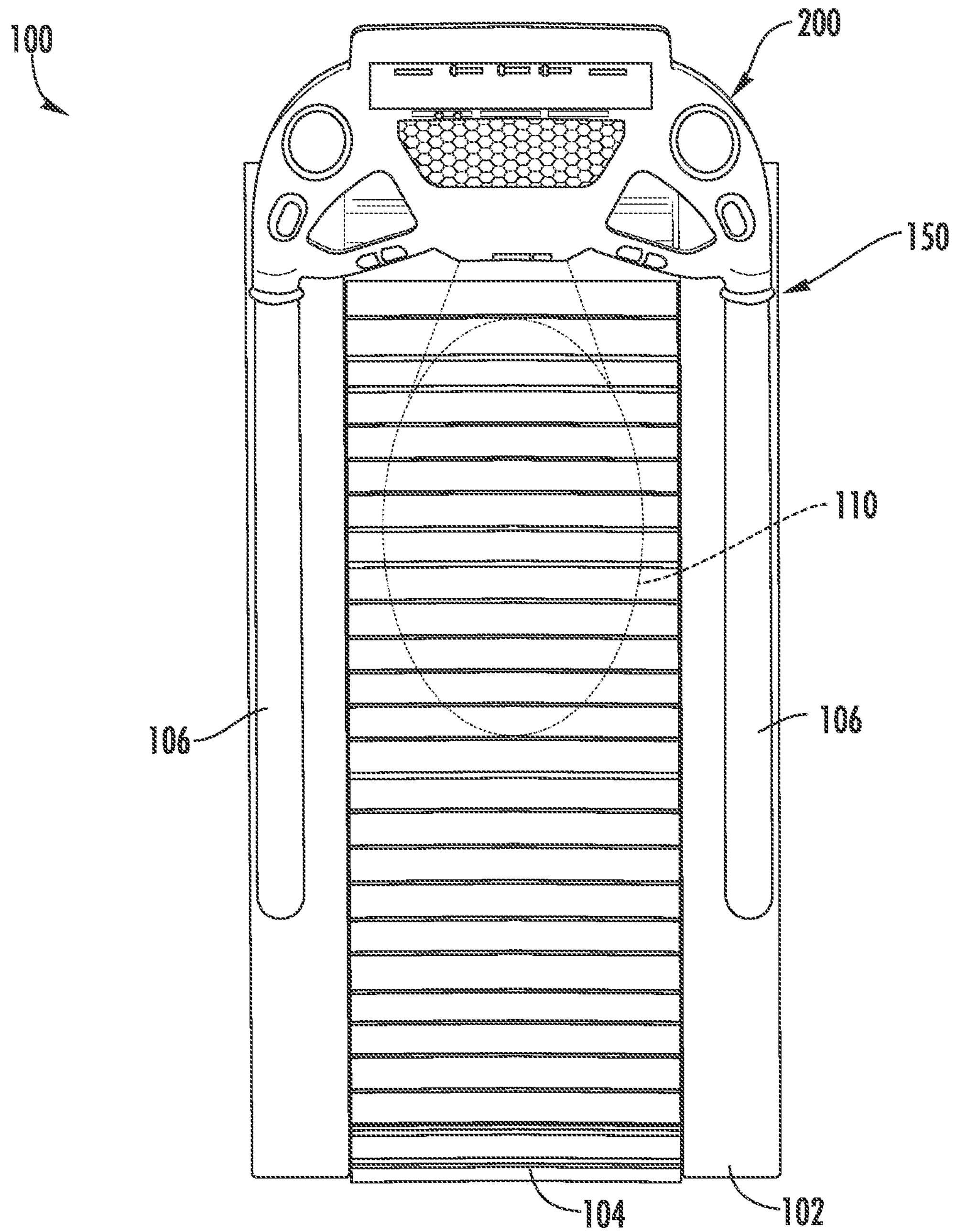
Figure 3:
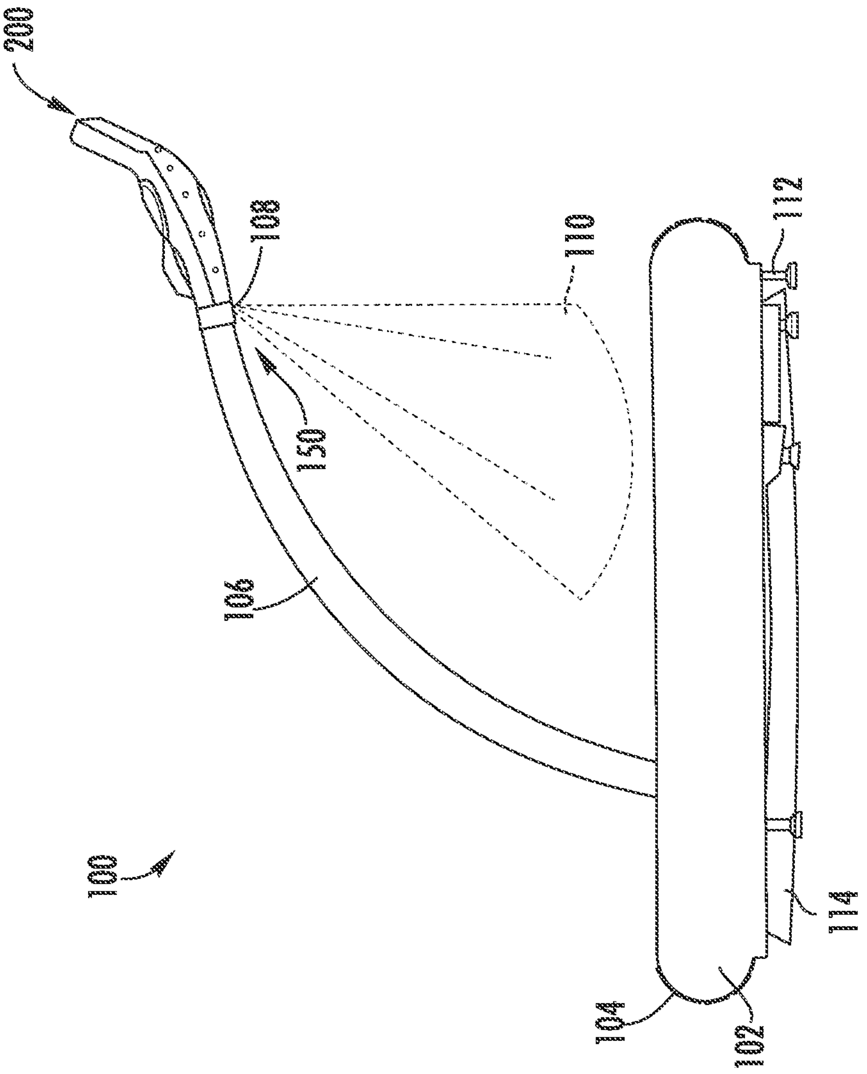
Figure 4:
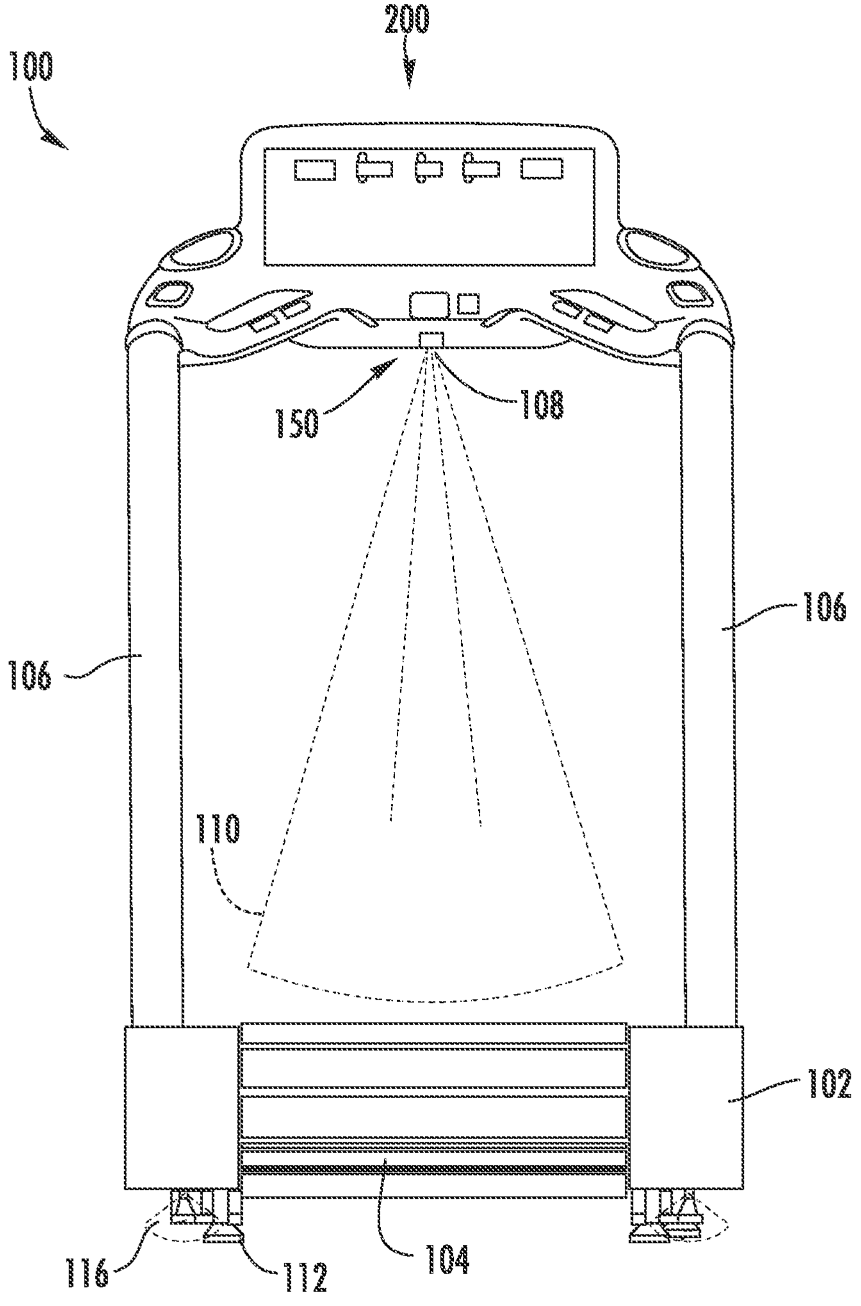

Before turning to the Figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to the Figures generally, a lighting system is disclosed according to various embodiments herein. In particular, a lighting system for a treadmill is disclosed according to various embodiments herein. In some uses of the treadmill, users prefer the treadmill to be situated in a dark or near dark environment. Therefore, Applicant has determined that a lighting system for the treadmill may be beneficial to increase visibility of the treadmill among other benefits. Particularly, Applicant has determined that the lighting system may provide dynamic and coordinated lighting routines (e.g., programs that vary one or more light sources' colors, brightness, transitions between colors and light sources, etc.), which provide useful and beneficial cues to the user of the treadmill (e.g., indicate their running speed, their positioning on the treadmill, and the like). According to the present disclosure, the lighting system includes a light that shines or illuminates a belt of the treadmill. In addition, lighting can also be included or disposed along a base of the treadmill, at or near a back or rear portion of the treadmill, within a base of the treadmill, along handrails of the treadmill, on or near the display of the display device, inside cup holders or other compartments of the display or console, as a metered light positioned substantially transverse to the longitudinal axis of the running belt, and/or along, within, or at various other portions of the treadmill. The lighting system may provide ambient lighting, dynamic lighting, or other customizable lighting. Therefore, Applicant has determined a lighting system on the treadmill may provide enhanced benefits relative to conventional treadmills especially when such treadmills are used in a dark or near dark environment. It should be understood that while the lighting system disclosed herein is described in relation to a treadmill, the present disclosure contemplates other applications of the lighting system with all such variations intended to fall within the spirit and scope of the present disclosure (e.g., a stationary bike, a skiing machine, a rowing machine, etc.).

Referring now to FIGS. 1-4, various views of a treadmill 100 with various lighting systems 150 are shown, according to an exemplary embodiment. The treadmill 100 includes a base 102, handrails 106 mounted or coupled to the base 102, a display device or console 200 coupled to the handrails 106, a running belt 104 that extends substantially longitudinally along a center of the base 102, and the lighting system 150. The base 102 generally refers to the lower portion of the treadmill 100 (i.e., all components of the treadmill 100 excluding the handrails and generally features positioned vertically above the base 102, such as the console 200). As shown, the base 102 may be elevated off a support surface for the treadmill 100 via legs 112 (e.g., support feet, etc.) coupled to the base 102.

In the example shown, the treadmill 100 receives power from a wall outlet (e.g., 120 VAC in the U.S., 230 VAC in other countries, etc.). The electrical connection is not depicted in FIGS. 1-4. In other embodiments, the treadmill 100 is powered by an on-board power source, such as one or more batteries. In still other embodiments, the treadmill 100 may include a power source, but also receive power from a remote location, such as an outlet. In an alternate embodiment, a generator may be included with the treadmill 100 that generates electricity to provide power to the lighting system 150 when a user operates the treadmill 100. All such variations and combinations thereof are intended to fall within the spirit and scope of the present disclosure.

In the example shown, the treadmill 100 includes a planar (e.g., a flat or substantially flat) running surface for the running belt 104 (i.e., the part of the running belt 104 that a user utilizes or engages with when using the treadmill 100). In other embodiments, the treadmill 100 includes a non-planar running surface. For example, the treadmill 100 may include a running belt 104 that defines a curved running surface upon which a user may run. In the example shown, the treadmill is motorized such that the running belt 104 is powered by a motor (not shown), which selectively drives, powers, moves, or otherwise rotates the running belt 104 at various desired running belt speeds. In other embodiments, the running belt 104 may be manually powered (i.e., no motor) such that a force applied by the user to the running belt 104 causes rotation or movement of the running belt 104. In these configurations, power for the lighting system 150 may be provided by a wall outlet, an electrical storage device on the treadmill (e.g., a battery), and/or some combination thereof.

In this embodiment, the lighting system 150 includes any combination of one or more different light sources, including a belt light source 108, under light source 114, tail light source 116, metered light sources 214, and cup holder light source 216. Each of these are described in more detail below. The first light source to be described is the belt light source 108, which is coupled to the console 200. In operation, the belt light source 108 creates, generates, emits, or otherwise provides a light beam 110 to illuminate the running belt 104. Beneficially, the belt light source 108 provides lighting to aid a user in seeing or observing the running belt 104 while operating the treadmill 100 as well as a position of their legs and feet on or near the belt 104.

The second light sources to be described are the underside light sources 114, which are coupled to an underside of the base 102. The underside of the base 102 includes under light sources 114 that extend substantially longitudinally along the underside of the base 102. Coupling of the under light sources 114 to the base 102 may be via any typical means (e.g., screws or other fasteners, adhesive, combination of adhesive and fasteners, etc.). The under light sources 114 provide ambient lighting to illuminate an area associated with the underside of the base 102 (i.e., around the base 102; between the base 102 and a ground or support surface for the treadmill 100). As shown, a rear of the base 102 may include other light sources, specifically tail light sources 116 that provide illumination outward and at least partly away from the rear of the base 102 (the "rear" or "back" refers to an area away from the display device, which is associated with the "front"). The tail light sources 116 provide a visualization of a rotation of the running belt 104. Such tail light sources 116 may also be an indicator to the user and others nearby of a "rear end" of the treadmill (i.e., where the physical structure of the treadmill 100 ends or stops). In combination with the under light sources 114, this set of light sources 114 and 116 may provide an indication to the user and to others of the occupied space or area of the treadmill 100 on a support surface. Such illumination may be beneficial to prevent or substantially prevent others from accidentally walking into the treadmill 100 when the others are in a dark or near dark environment.

In some embodiments, the treadmill 100 includes light sources along the side of the belt 104. For example, the treadmill 100 may include track light sources coupled to the base 102 along a top portion of the base 102 and proximate the belt 104 (i.e., longitudinally along each side of the belt 104). For example, the treadmill 100 may include a first track of light sources along a first side of the belt 104 and a second track of light sources along a second side of the belt 104. The track light sources may thereby illuminate the edges of the belt and make it easier for a user to center themselves on the running belt 104 as well as providing additional ambient lighting of the treadmill 100. In some embodiments, the treadmill 100 may include light sources (not shown) extending along or substantially along a length of the handrails 106. The handrail light sources may aid in helping the user find the handrails 106 during use of the treadmill 100 as well as providing additional ambient lighting for the treadmill 100.

Figure 5:
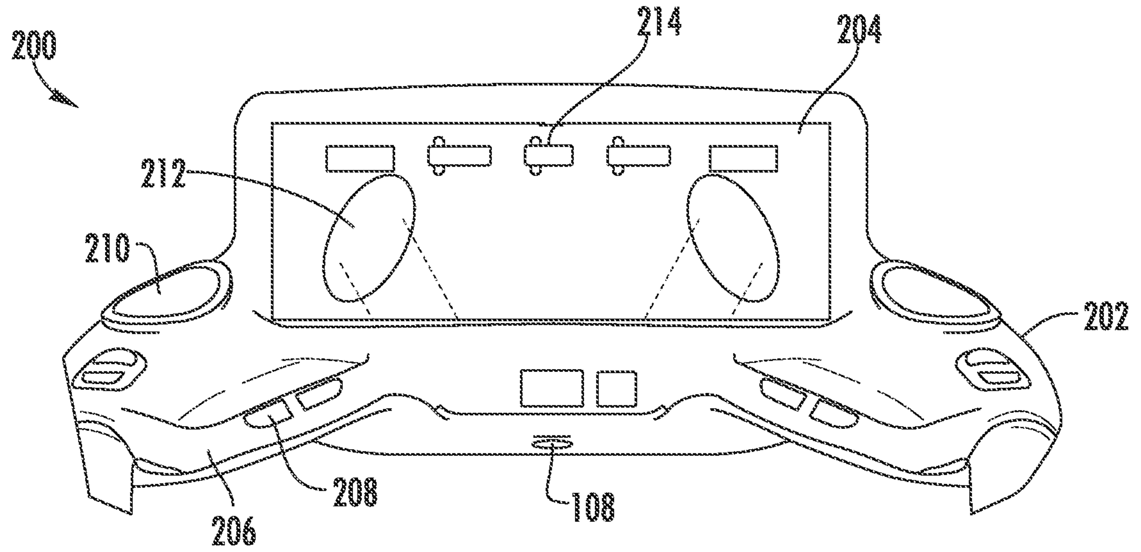
FIGS. 5-6 show close up views of a display device of the treadmill of FIGS. 1-4, according to an exemplary embodiment.
Figure 6:
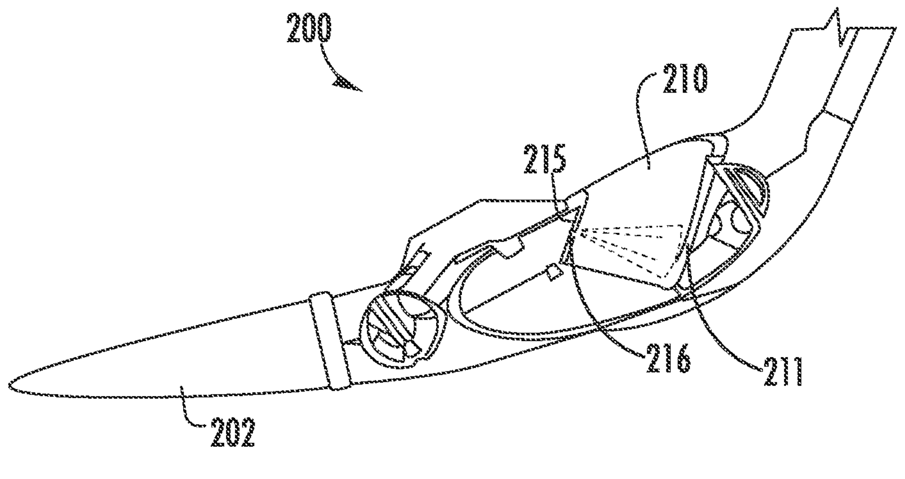

Referring now to FIGS. 5-6, close up views of the console 200 of the treadmill 100 of FIGS. 1-4 are shown, according to an exemplary embodiment. As shown, the display device or console 200 includes a display base 202 mounted to or coupled to the handrails 106, and a display screen 204 mounted to or coupled to the display base 202. The console 200 may include an integrated power source (e.g., a battery), or be electrically coupleable to an external power source (e.g., via an electrical cord that may be plugged into a wall outlet). The console 200 may include any type of display device including, but not limited to, touchscreen display devices, physical input devices in combination with a touch screen, physical input devices in combination with a display, and so on.

In the example shown, the display base 202 includes additional handrails 206. In other embodiments, such handrails 206 may be excluded from the console 200. The handrails 206 are shown to include sensors 208 which are configured to collect body parameter information or data from a user when, e.g., their hands are placed on or otherwise engage with the sensors 208. The body parameters may include, but are not limited to, heart rate, calorie count, $SpO_2$, $CO_2$, $O_2$, etc. Thus, the sensors 208 may have any structural configuration adapted to acquire such data.

Various sensors 208 may be included with the treadmill 100 and structured to acquire data regarding the use of the treadmill 100 by a user and/or data which can be collected, or calculated, using the sensors 208. The acquired information may be displayed via the display screen 204. The data may also include workouts preprogrammed into the treadmill 100. This data may be used as an input for the lighting system 150.

The display base 202 also includes cup holders 210 and, in some embodiments, may further include other compartments. The cup holders 210 and/or other compartments allow a user to store beverage containers (e.g., cups, bottles, cans, etc.), electronics (e.g., mobile phones, music players, television remotes, etc.), keys, cards (e.g., personal identification, club membership cards, etc.), or various other items. In the embodiment shown, a pair of cup holders 210 are positioned symmetrically across a center line of the treadmill. The cup holders 210 may be formed as substantially cylindrical recesses in the display base 202. As shown, the cup holders 210 may be coupled to the console 200 and/or the handrails 106.

In this configuration and as mentioned above, the lighting system 150 includes a light source disposed in the cup holder 210, for example a cup holder light source 216 operable to project light into, onto, and/or out of the cup holder 210. In the embodiment shown, the cup holder light source 216 is coupled to a first side wall 215 of the cup holder 210 and oriented to project light onto an opposing side wall 211 of the cup holder 210. The light may reflect off the opposing side wall 211 and/or a bottle, cup, etc. placed in the cup holder 210 to illuminate the cup holder 210. In other embodiments, the cup holder light source 216 may be disposed near or proximate to the cup holder 210, for example around an outside edge of the cup holder 210. The cup holder light source 216 thereby aids the user in placing items into the cup holders 210 by illuminating the cup holders 210. In embodiments where a pair cup holders 210 are positioned symmetrically across the center line of treadmill, the light from the cup holder light sources at each cup holder 210 may facilitate the user in positioning him or herself centrally on the running belt in a substantially dark environment.

The display screen 204 is adapted or configured to display various information to a user (e.g., speed of the running belt, exercise routine (e.g., 5 KM run), heart rate or other user health data, time elapsed, time remaining, calories burned, distance traveled, and so on). As shown, the display screen 204 is a touchscreen display with a backlight. In some embodiments, the display screen 204 provides visual options for a user to select via buttons (not shown). As also shown, the console 200 includes light sources that illuminate the display screen 204, for example display lights 212, which are also configured to illuminate buttons of the console 200 when such buttons are included with the console 200. In some embodiments, display light sources 212 illuminate both the display screen 204 and the console 200. As further shown, the console 200 or the display screen 204 includes metered light sources 214 coupled to the console and positioned horizontally across the console. The metered light sources 214 include multiple light sources that form a series of bars that can be individually lit to provide additional information to a user.

Figure 7:
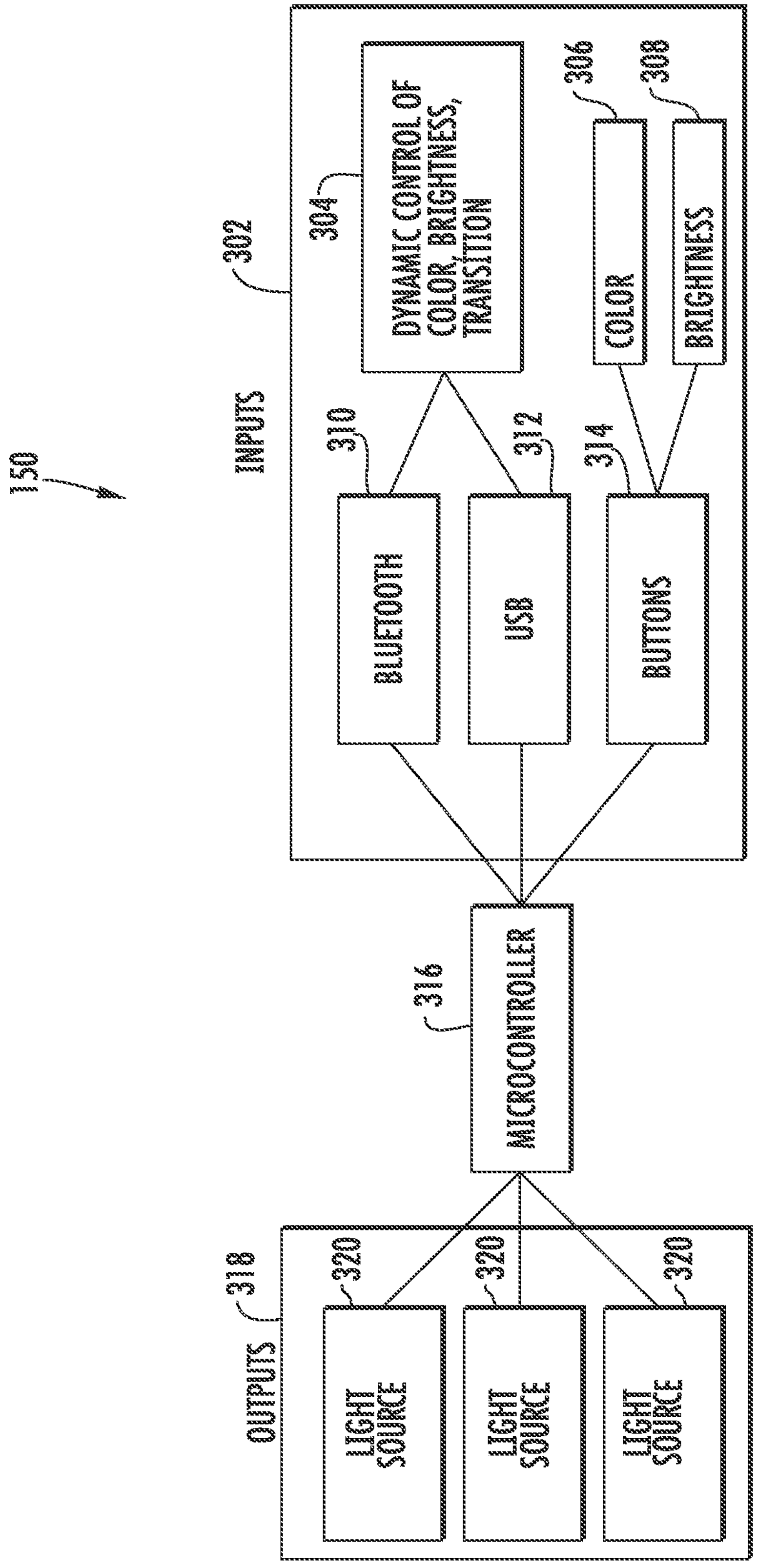
FIG. 7 shows a block diagram of the lighting system of FIGS. 1-4, according to an exemplary embodiment.

Referring now to FIG. 7, a block diagram of the lighting system 150 of FIGS. 1-4 is shown, according to an exemplary embodiment. The lighting system 150 includes inputs 302, a microcontroller 316, and outputs 318. The inputs 302 represent parameters and ways to receive parameters of the lighting system 150. In this regard and as shown, the ways to receive parameters are shown to be any of a combination of wireless and wired transmission technologies (i.e., the parameters could be received via only wired technology, only wireless technology, or via a combination of wired and wireless technologies). In the example depicted, control parameters for the lighting system 150 may be received via both wired and wireless technologies. In this regard, ways to receive various control parameters for the lighting system 150 include a wireless transmission technology, which is shown as a BLUETOOTH connection 310, and various wired/direct communication technologies, which are shown as a USB connection 312 and buttons 314. It should be understood that any type and combination of wired (e.g., cables, etc.) and/or wireless communication technologies (e.g., Internet, near-field communication transmission, radio technology, etc.) may be used to supply the control parameters to the microcontroller 316. In this regard, remote control technologies (e.g., a remote controller disposed away/separate from treadmill 100) may be coupled to the microcontroller 316, which would enable remote control of the lighting system 150. Further, other input devices included with the treadmill 100 other than, or in addition to, the buttons 314 may be used to define one or more control parameters. The parameters of the inputs 302 are described in more detail below. The inputs 302 may be used by the microcontroller 316 to control operation of the outputs 318, which represent the light sources 320. In other words, the inputs 302 may dictate how the lighting system 150 operates. In some embodiments, a default program may be utilized by the microcontroller 316 to control operation of the lighting system 150.

The microcontroller 316 is a controller or control system for the lighting system 150. While shown as only one component, the microcontroller 316 may include two or more sub-controllers. Further, in some embodiments, the microcontroller 316 may be included with a controller or control system for the treadmill 100 overall. The microcontroller 316 may have a variety of configurations. In the example shown, the microcontroller 316 represents a computer on a single integrated circuit (i.e., a system on a chip). The microcontroller 316 may include one or more processing components (e.g., a processor such as that described below) coupled to one or more memory devices (example structures described below). Additionally, the microcontroller 316 may include one or more communications interfaces (e.g., BLUETOOTH, USB, internet, etc.) for communicably coupling the microcontroller 316 to one or more components. The one or more processing components may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The one or more memory devices (e.g., RAM, ROM, Flash Memory, hard disk storage, etc.) may store data and/or computer code for facilitating the various processes described herein. The one or more memory devices may be communicably connected to the one or more processors to provide computer code or instructions to the one or more processors for executing at least some of the processes described herein. Moreover, the one or more memory devices may be or include tangible, non-transient volatile memory or non-volatile memory. Accordingly, the memory devices may include any type of information structure for supporting the various activities and information structures described herein.

As shown, the parameters depicted in the inputs 302 include a preference for a dynamic (i.e., changing) or static (unchanging) control of color from the light sources 320, brightness of the light sources 320 or of a subset of the light sources 320, and transitions 304 of light sources 320 on the treadmill 100 (i.e., how the light sources 320 transition between and among each other, how the colors transition, how brightness transitions, how light sources 320 flash, blink, etc. and the like), which as mentioned above may be received via a USB 312 or BLUETOOTH 310 communication. It should be understood that this configuration is not meant to be limiting as other inputs are also contemplated by the present disclosure (e.g., which light sources are activated/on and when, flashing, blinking etc.). Alternatively, or in addition to the dynamic control of color, brightness, and transitions 304, buttons 314 may be used to receive color 306 and brightness 308 control from the user. The dynamic control of color, brightness, and transitions 304 may also include data collected from the treadmill 100 (e.g., sensors 208, running belt 104, etc.).

As mentioned above, the outputs 318 represent how the microcontroller 316 (also referred to herein as a controller) controls the lighting system 150 (i.e., how the lighting system 150 and, particularly, light sources 320 are operated based on one or more inputs 302). The light sources 320 refer to the various light sources of the lighting system 150 described above. In this regard, the light sources 320 include the belt light source 108, under light sources 114, track light sources, tail light sources 116, handrail light sources, cup holder light sources 216, and metered light sources 214. In one embodiment, the light sources 320 are LED light sources (e.g., RGB LEDs, RGBW LEDs, etc.). In another embodiment, the light sources 320 may be any type of light source (e.g., fluorescent, halogen, incandescent, etc.). In still another embodiment, the light sources 320 are a combination of LEDs and another type of light source. All such structural configurations for the light sources 320 themselves are contemplated to fall within the present disclosure.

The data collected from the treadmill 100 may include stride length. In one embodiment, stride length may be determined using a repeater wheel on the treadmill. The repeater wheel acquires/determines impulses in speed collected from impact of a foot of a user, which causes an impulse in speed. A time between impulses is determined, and a distance traveled by the running belt 104 can then also be subsequently determine using one or more algorithms or formulas.

The data collected may also include stride force (e.g., acquired by sensors, such as load cells disposed proximate the running belt 104), heart rate, cadence, pace, distance, resistance level, incline level, calorie count, time, carver counts, carver cadence, bounce, step count and/or proximity of the user from the left, right, front and/or back of the running belt 104.

As described herein, the collected data may be used by the microcontroller 316 to control or manage the lighting system 150. Particulars of the control scheme or routine may be defined in regard to one or more inputs 302 (e.g., a user may designate that speeds above a certain threshold should cause the belt light source 108 to illuminate yellow whereby the data collected includes speed data, which is then in turn utilized by the controller 316 to selectively cause the belt light source 108 to illuminate yellow). In one embodiment, a single data parameter is used for the dynamic control of color, brightness, and transitions 304. In other embodiments, a combination of data is used for dynamic control of color, brightness, and transitions 304. For example, different light sources 320 may be controlled, at least partially or indirectly, through specifically designated data (e.g., the belt light source 108 is controlled by data collected regarding the speed of the belt while the metered light sources 214 are controlled based on data collected indicative of a position of the user on the running belt, etc.).

The dynamic control of color, brightness, and transitions 304 includes parameter settings to control the light sources 320 based on the data collected. The dynamic control of color, brightness, and transitions 304 may cause color, brightness or a transition between color and brightness when a parameter of the data changes (e.g., transition from red to green when the user reaches a target heart rate range, increase in brightness as distance traveled increases, etc.). The dynamic control of color, brightness, and transitions 304 may be preset, or may be provided parameters to the user via the display screen 204 that can be modified by the user via buttons 314. The user may be able to adjust the color, brightness and/or transitions as well as change parameters that cause the changes in color, brightness or transitions. As mentioned above, the transitions may include color transitions, which light source transitions to which light source (e.g., under light sources to tail light sources), brightness transitions, and/or a combination thereof. In some embodiments, color schemes may be associated with data, workout profiles, or selected by the user. In some embodiments, the user may be able to independently control light sources on a left side of the treadmill 100 and a right side of the treadmill 100. In some embodiments, a change may be indicated by a flash of light.

In this regard, the data collected may be used to define ranges, thresholds or other parameters used by the microcontroller 316 to control the light sources 320. For example, a target heart rate range can be set by the user or preprogrammed by the treadmill 100. When the user is within the target heart rate range, the light sources 320 may illuminate a first color (e.g., green); when the user is below the target heart rate range, the light sources 320 may illuminate a second color (e.g., blue); and when the user is above the target heart rate range, the light sources 320 may illuminate a third color (e.g., red). The transitions between colors may include a fade of one color into the next, a substantially abrupt change from one color to the next, a mix of both colors during the transition, etc. or a combination thereof. In another example, the user may set a target distance (e.g., 3 miles). When the user is below a first distance threshold (e.g., less than 1 mile), the light sources 320 may illuminate at a first brightness (e.g., dim); when the user is below a second distance threshold (e.g., between 1 mile and 2 miles), the light sources 320 may illuminate at a second brightness (e.g., regular); when the user is below a third distance threshold (e.g., between 2 miles and 3 miles), the light sources 320 may illuminate at a third brightness (e.g., bright). The transitions between brightness may include a fade of one brightness into the next, a substantially abrupt change from one brightness to the next, etc. or a combination thereof. In some embodiments, both color and brightness can be used and a combination of transitions can be used.

In other words, the microcontroller 316 may set a threshold value of a parameter (e.g., a particular speed, distance, heartrate, cadence, etc.). The microcontroller 316 may receive data indicating the current value of that parameter, for example from a sensor that measures the parameter, and compare the current value to the threshold value. The microcontroller 316 may then control light sources 320 to emit light of a first color, brightness, pattern, etc. if the current value is less than the threshold value and a second color, brightness, pattern, etc. if the current value is greater than the threshold value. A desired range for a parameter may be defined using a first threshold (i.e., a minimum value) and a second threshold (i.e., a maximum value). The microcontroller 316 may control the light sources 320 to provide cues to a user or instructor regarding use of the treadmill 100.

In some embodiments, the dynamic control of color, brightness, and transitions 304 includes dynamic control of the metered light sources 214. The metered light sources 214 include multiple independent light sources (e.g., bars). Dynamic control of the metered light sources 214 may cause the individual light sources of the metered light sources 314 to individually illuminate. For example, the metered light sources 214 may include a number of individual light sources (e.g., 3, 4, 5, 7, etc.) that can be individually illuminated. The individual light sources of the metered light sources 214 can be individually illuminated based on user input, data, data parameters, etc. In some embodiments, a single light source of the metered light sources 214 may illuminate when a certain parameter is obtained (e.g., a distance, a time, an incline level, etc.). For example, in some embodiments, the metered light sources 214 are used to provide the user with information relating to a positioning of the user on the running belt 104 of the treadmill 100. For example, if the user is continuously running on the left side of the belt, the metered light sources may illuminate on the right side to indicate that the user should move slightly right on the treadmill 100. As another example, a light source on a right side of the metered light sources 214 may illuminate when the user is running to a right of a center line of the running belt 104.

In some embodiments, the light sources 320 may be individually controlled such that some light sources 320 are dynamically controlled (i.e., change in color and/or brightness based on inputs and settings), while other light sources 320 maintain static lighting (i.e., do not change in brightness or color). In some embodiments, the light sources 320 sync to music being played by the user or a class, such that the light sources 320 are dynamically controlled based on tempo, bass, volume, etc. to pulse, change color, brightness or transition from different settings.

In some embodiments, multiple treadmills 100 can be synced to one another or to a lead treadmill (e.g., a treadmill used by an instructor) or to a control device (e.g., computer, smartphone, tablet) of an instructor or leader of a class. Thus, control of the lighting system 150 may be performed via an instructor who may be situated in a same geographic location as the treadmill or completely remote from the treadmill 100. The synced treadmills 100 may allow an instructor to provide cues to the users based on changes to the light sources 320 on the treadmill 100. In some embodiments, the synced treadmills can provide a light indication of a position in a race (e.g., Prosmart competitions). In this configuration, the lighting system 150 may be set to display team colors. Additionally, the remote controller can simply control various outputs from the lighting system 150 (e.g., when certain colors are illuminated, the duration of that illumination, etc.).

In some instances, the treadmill 100 may be used underwater. As such, the lighting system 150 may display a color that is indicative of a temperature of the water for the treadmill 100. For example, is the water is above a certain predefined threshold temperature, one or more light sources may illuminate red. If the water temperature is below the predefined threshold temperature, one or more light sources may illuminate green (to indicate a in "GO" message that the treadmill 100 is ready for use). Thus, one or more temperature sensors may be included with the treadmill 100 to acquire temperature data indicative of the water temperature. Such data may then be fed to the lighting system 150 for use.

The lighting system 150 may also provide cues to the user. As alluded to above, the metered light sources may be used to indicate to a user if he/she is running in the center or near center of the treadmill. Because the display may be turned off in the dark setting (perhaps based on an instructor's remarks), the running belt light source may illuminate different colors to indicate whether the user is running at the defined desired speed (e.g., green if the user is at or above the threshold, yellow if the user is within a certain amount of the threshold but still below said threshold, or red if the user is below the threshold by more than the certain amount, etc.). Thus, many different operational cues can be provided to the user via the lighting system 150, such that the aforementioned list and description is not meant to be limiting.

Figure 8:
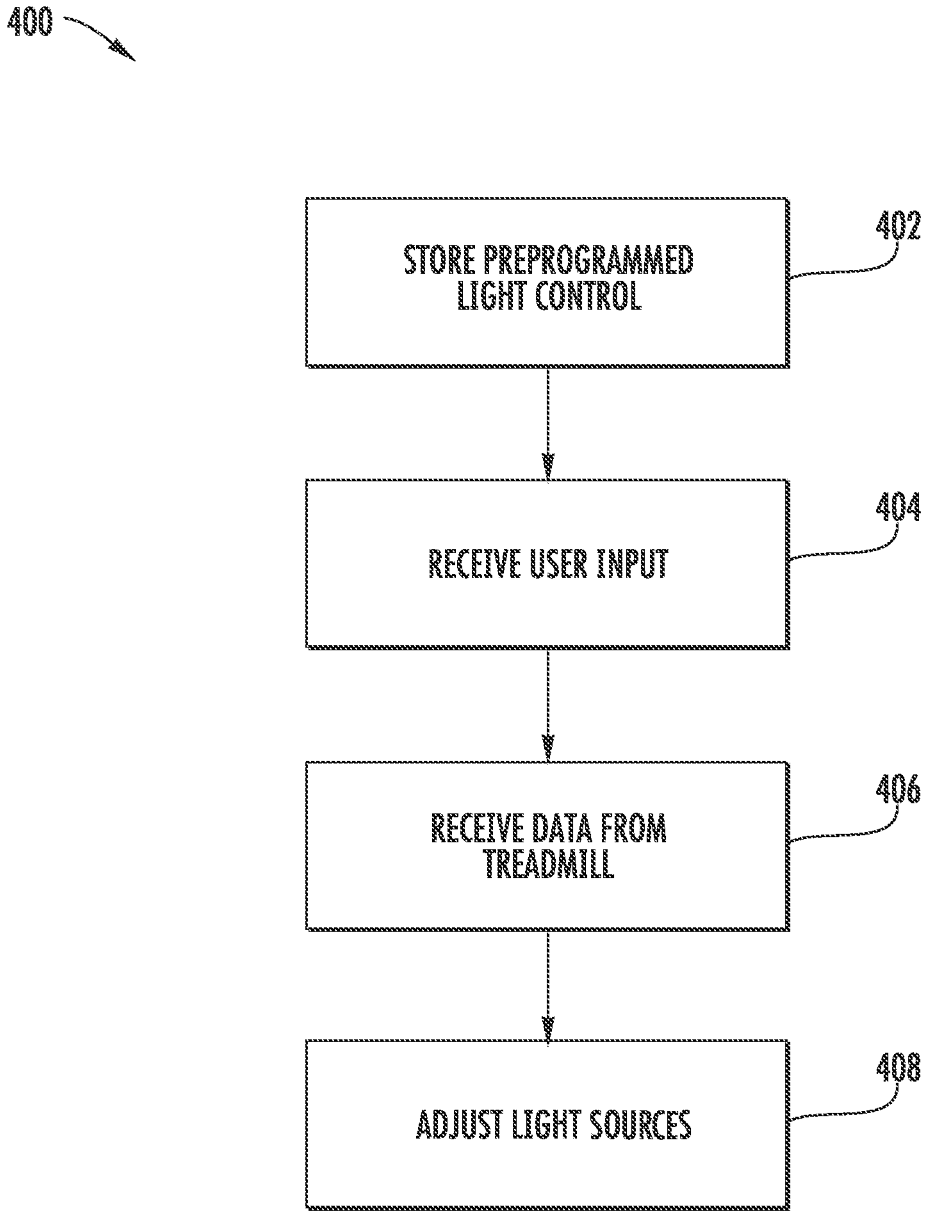
FIG. 8 shows a flow diagram of method of using the lighting system of FIG. 7, according to an exemplary embodiment.

Referring now to FIG. 8 a flow diagram of a method 400 of using the lighting system 150 of FIGS. 1-7 is shown, according to an exemplary embodiment. Method 400 includes storing preprogrammed light controls at 402, receiving a user input at 404, receiving data regarding operation of the treadmill 100 at 406, and adjusting the light sources 320 at 408.

Storing preprogrammed light control at 402 includes storing parameters relating to the control of the dynamic control of color, brightness, and transitions 304 based on at least one of a user input and data collected and/or determined. The dynamic control of color, brightness, and transitions 304 may cause color, brightness or a transition between color and brightness when a parameter of the data changes (e.g., transition from red to green when the user reaches a target heart rate range, increase in brightness as distance traveled increases, etc.). The dynamic control of color, brightness, and transitions 304 may be preset, or may provide parameters to the user via the display screen 204 that can be modified by the user via buttons 314. The user may be able to adjust the color, brightness and/or transitions as well as change parameters that cause the changes in color, brightness or transitions. In some embodiments, the transitions include color transitions, brightness transitions or a combination thereof. In some embodiments, color and brightness schemes may be associated with the collected data or workout profiles selected by the user. For example, if the user selects a certain piece of data to monitor (e.g., heart rate, distance, speed, etc.), the lighting system 150 may include a predefined color and brightness scheme (e.g., blue for a first parameter, green for a second parameter, red for a third parameter, etc.) for the selected data. As another example, the lighting system 150 may provide multiple color and brightness schemes that the user can choose from once the monitored data is selected. For example, the lighting system 150 may include a first color and brightness scheme (e.g., one static color, brightness changes), a second color and brightness scheme (e.g., color changes, brightness is static), a third color and brightness scheme (e.g., color changes and brightness changes), etc. As still another example, when a workout profile (e.g., predefined changes in parameters such as resistance, incline, speed, etc. throughout a set period of time, distance, etc.) is selected, the lighting system 150 may include a predefined color and brightness scheme/routine associated with the changes in various parameters, similar to above. As yet another example, the lighting system 150 may provide multiple color and brightness schemes that the user can choose from once the workout profile is selected. As still a further example, the user may be able to independently control light sources 320 on a left side of the treadmill 100 and a right side of the treadmill 100. In this regard, the user may be able to monitor two separate pieces of data by assigning one type of data to the light sources 320 on the left side of the treadmill 100 and assigning a second type of data, different from the first type of data, to the light sources 320 on the right side of the treadmill 100. As yet a further example, a change may be indicated by a flash of light. For example, instead of changing a color or brightness level when a threshold is cross or a range is entered/exited for a type of data, the lighting system 150 may cause the light sources 320 associated with the data to blink, increase/decrease in brightness for a short period of time (e.g., flash), illuminate a different color for a short period of time, etc.

Receiving user input at 404 includes receiving workout metrics, workout programs, color, brightness, and/or transition selections. The user input may be received via buttons, a touchscreen of the display screen 204, or other means of user input (e.g., via wired, wireless, wired and wireless connection, such as BLUETOOTH, USB, etc.).

The data received regarding operation of the treadmill 100 at 406 may include stride length, based on impulses in speed collected from impact of a foot of a user, time between impulses, and a distance traveled by the running belt 104. The data collected may also include stride force, heart rate, cadence, pace, distance, resistance level, incline level, calorie count, time, carver counts, carver cadence, bounce, step count, ground contact time, vertical oscillation, and/or proximity of the user from the left, right, front and/or back of the running belt 104. Data can be collected, or calculated, using the various sensors included with the treadmill 100 (e.g., sensors 208), information inputted using the display screen 204 and/or received from other devices, for example fitness watches, heartrate monitor straps, other wearable devices, a group workout leader device, etc. The data may also include workouts preprogrammed into the treadmill 100. In some embodiments, a single data parameter is used for dynamic control of color, brightness, and transitions 304. In some embodiments, a combination of data is used for dynamic control of color, brightness, and transitions 304. In some embodiments, different light sources 320 receive different data for dynamic control of color, brightness, and transitions 304.

In some embodiments, the dynamic control of color, brightness, and transitions 304 includes dynamic control of the metered light sources 214. Dynamic control of the metered light sources 214 may incrementally light up based on increases in parameters of the data. In one embodiment, a single light source of the metered light sources 214 may illuminate when a certain parameter is obtained (e.g., a distance, a time, an incline level, etc.). In another embodiment, the metered light sources 214 are used to provide the user with information relating to positioning of the user on the running belt 104 of the treadmill 100. For example, a light source on a right side of the metered light sources 214 may illuminate when the user is running to a right of a center line of the running belt 104. Conversely, a light source on a left side of the metered light sources 214 may illuminate when the user is running to a left of a longitudinal center line of the running belt 104. When the user is running in the longitudinal center of the belt 104, the center light source or center portion of the metered light sources 214 may illuminate. These cues/indicators help the user understand their running, walking, or generally usage characteristics of the treadmill 100, for example to help a user stay centered on the running belt 104 in a dark environment.

Various sensors may be used to determine the position of the user relative to the center line of the running belt 104 to facilitate control of the metered light sources 214 as described above. For example, force or load sensors may be distributed in the running belt 104 or in the base 102 to detect a location of a user's footsteps relative to the center line of the running belt. In other embodiments an array of laser-based distance sensors are positioned along the console and/or the handrails. The distance sensors may detect the proximity of the user's body to a handrail and/or the presence or absence of the user's body in various regions above the running belt 104. In some embodiments, a camera captures images of the user on the running belt 104 and a machine vision approach is used to determine the position of the user relative to the center line of the running belt. These and other possibilities are contemplated by the present disclosure.

In some embodiments, the light sources 320 may be individually controlled such that some light sources 320 are dynamically controlled, while other light sources 320 maintain static lighting (i.e., unchanging). The light sources 320 may also sync to music being played by the user or a class, such that the light sources 320 are dynamically controlled based on tempo, bass, volume, etc. to pulse, change color, change brightness, or transition from different parameter settings.

In some embodiments, multiple treadmills 100 can be synced to one another or a lead treadmill (e.g., a treadmill used by an instructor). The synced treadmills 100 may allow an instructor to provide cues to the users based on changes to the light sources 320 on the treadmill 100. In some embodiments, the synced treadmills can provide a light indication of a position in a race (e.g., Prosmart competitions).

In some embodiments, the lighting system 150 may be set to display team colors. In some embodiments, the lighting system 300 may display a temperature of water for the treadmill 100 (i.e., for underwater treadmills). In some embodiments, the lighting system 150 provides cues for running. Thus, the lighting system 150 adjusts the light sources 320 at 406 based on the preprogrammed light control, user input and data received, or a combination thereof as described above.

Referring now to FIGS. 9-15, a lighting system 550 for an exercise and therapeutic device, shown as a treadmill 500, is depicted according to another exemplary embodiment. While a different reference number 500 is used to indicate the treadmill 500, the treadmill 500 has the same structure and function as the treadmill 100 except that the treadmill 500 includes light sources not included with the treadmill 100. Therefore, similar reference numbers are included with the treadmill 500 that were used with the treadmill 100 to refer to similar components. Accordingly and as described above, the treadmill 500 may be motorized or non-motorized, have a predominately flat or non-flat running surface (e.g., curved), and any of the other aforementioned described characteristics. Further, the lighting system 550 may be controlled via the controller 316. As such, method 400 is equally applicable with the lighting system 550 of the treadmill 500. Therefore, it should be understood that reference may be made to the controller 316, inputs 302, and outputs 318 to aid explanation of the lighting system 550. Additionally, one or more of the light sources of the lighting system 550 may be included with the treadmill 100; alternatively, one or more of the light sources of the lighting system 150 may be included with the treadmill 500 and lighting system 550. All such variations are intended to fall within the scope of the present disclosure.

Figure 9:
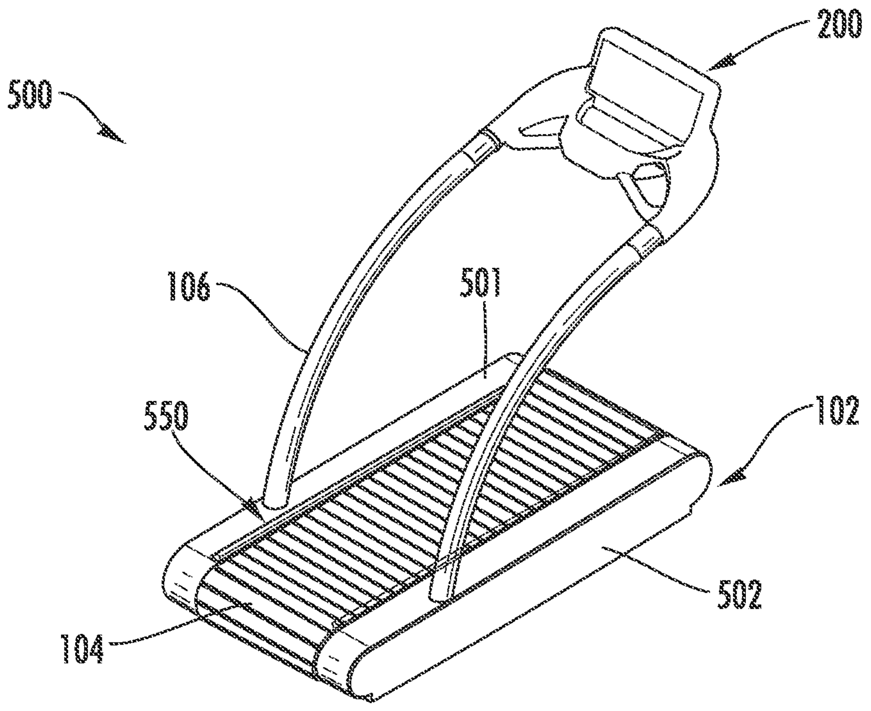
FIG. 9 is a perspective view of a treadmill with a lighting system, according to another exemplary embodiment.
Figure 10:
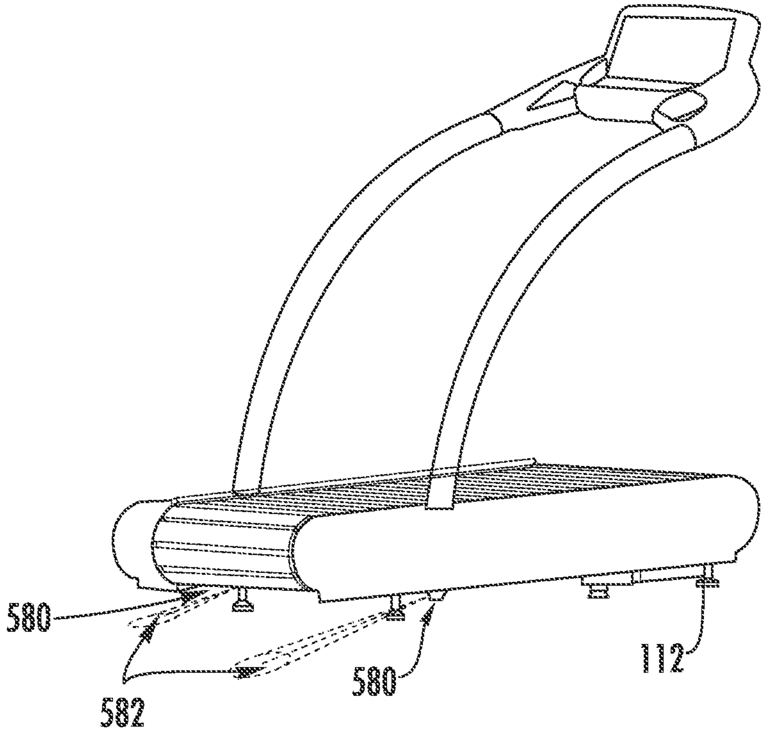
FIG. 10 is another perspective view of the treadmill of FIG. 9.

With the above in mind and referring more particularly to FIGS. 9-10, as shown, the treadmill 500 includes a base 102, handrails 106 mounted or coupled to the base 102, a display device or console 200 coupled to the handrails 106, a running belt 104 that extends substantially longitudinally along a center of the base 102, and the lighting system 550. From the viewpoint of the user facing the console 200, the base 102 includes left and ride side panels 501 and 502 (e.g., covers, shrouds, etc.) that shield, cover, house, and/or protect various internal components of the treadmill 500 (and treadmill 100, despite these panels not being called out in the earlier Figures).

In the example depicted in FIG. 9 (and as shown in the earlier Figures), the running belt 104 is structured as a slatted running belt. A description of a construction of a slatted running belt is provided in U.S. Pat. No. 8,986,169, which is owned by the Applicant and incorporated herein by reference in its entirety. In an alternative embodiment, the running belt may be constructed as an endless belt, also referred to as a closed-loop treadmill or running belt (e.g., a non-slat embodiment).

Figure 14:
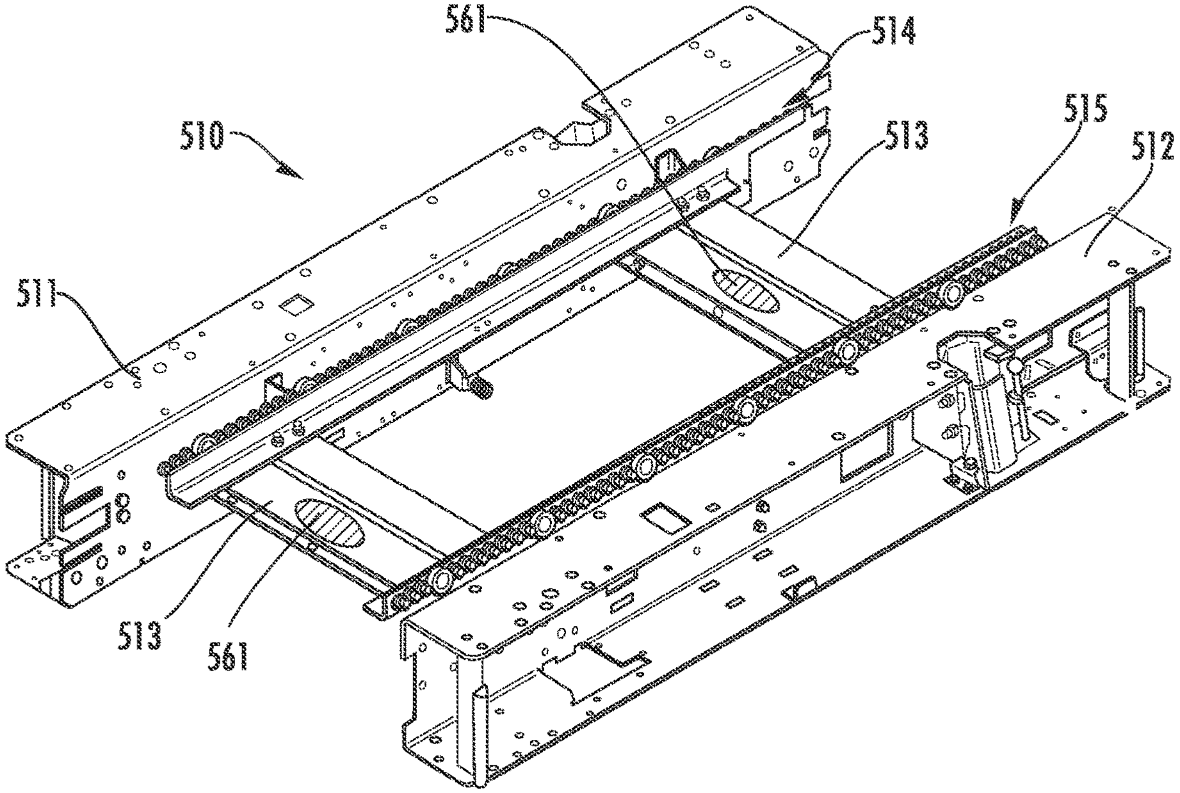
FIG. 14 is a perspective view of the base of the treadmill of FIG. 9 with most of the coverings and other components removed, according to an exemplary embodiment.

Before turning to the lighting system 550, referring more particularly now to FIG. 14, a depiction of the base 102 of the treadmill 500 with the side panels 501, 502, the legs 112, and various other components (e.g., front and rear shaft assemblies, the motor and motor assembly, etc.) removed is shown according to an exemplary embodiment. As shown, the base 102 includes a frame 510 which is an assembly of elements including longitudinally-extending, opposing side members, shown as a right side member 511 (first side member) and a left side member 512 (second side member) and one or more lateral or cross-members 513 extending between and structurally coupling the side members 511 and 512. The frame 510 is adapted to support a front shaft assembly (not shown) positioned near a front end of the frame 510, a rear shaft assembly (not shown) positioned near the rear end of frame 510, a plurality of bearings 514 coupled to and extending generally longitudinally along the right side member 511 of the frame 510, a plurality of bearings 515 coupled to and extending generally longitudinally along the left side member 512 of the frame 510. The pluralities of bearings 514, 515 are substantially opposite each other about a longitudinal axis 18 of the running belt 104. The pluralities of bearings 514, 515 are structured to support, at least partially, the running belt 104. Additional description of these components, the arrangement thereof, and the functionality thereof (in combination with other components, such as a motor) is provided in U.S. patent application Ser. No. 15/640,180, which has the same Applicant and which is incorporated herein by reference in its entirety. Accordingly, the running belt 104 is coupled to the frame and configured to rotate about the one or more cross-members 513.

With the above in mind, turning now to the lighting system 550 and FIGS. 9-15 collectively, the lighting system 550 is shown to include a first lighting system 560 (e.g., internal lighting system), shown as light sources, specifically internal light sources, and a pair of second lighting systems, shown as light sources, specifically tail light sources or second lighting systems 580. The lighting system 550 is operable in the same manner as described above with respect to the lighting system 150 where the controller 316 controls the color, brightness, static versus dynamic capability, remote controlling, frequency of blinking/staying at a color, actuation of some but not all light sources, and so on based on a predefined lighting routine, acquired data (e.g., stride information, etc.), and the like is equally applicable with the lighting system 550 (see, e.g., method 400). Therefore, the structure and arrangement, but not the function, of the lighting systems 560 and 580 are described below.

Referring first to the first lighting system 560 and in turn particularly FIGS. 9-10 and 14-15, the first lighting system 560 is disposed within the base 102 of the treadmill 500 and configured to emit or illuminate light out of the base 102 to illuminate, at least partly, the base 102 and the area surrounding the base 102. As shown, the first lighting system 560 includes one or more light sources 561, each of which are operable to emit light 562 (e.g., a beam, a beam of light, a glow, a radiance, etc.). The one or more light sources 561 have the same structure as the light sources 320. In the example shown, the one or more light sources 561 are structured LED light sources (e.g., RGB LEDs, RGBW LEDs, etc.). However and as mentioned above, in another embodiment, the one or more light sources 561 may be any light type (e.g., fluorescent, halogen, incandescent, etc.)

while in still other embodiments, the one or more light sources 561 may be any combination of LEDs and another light source.

Figure 15:
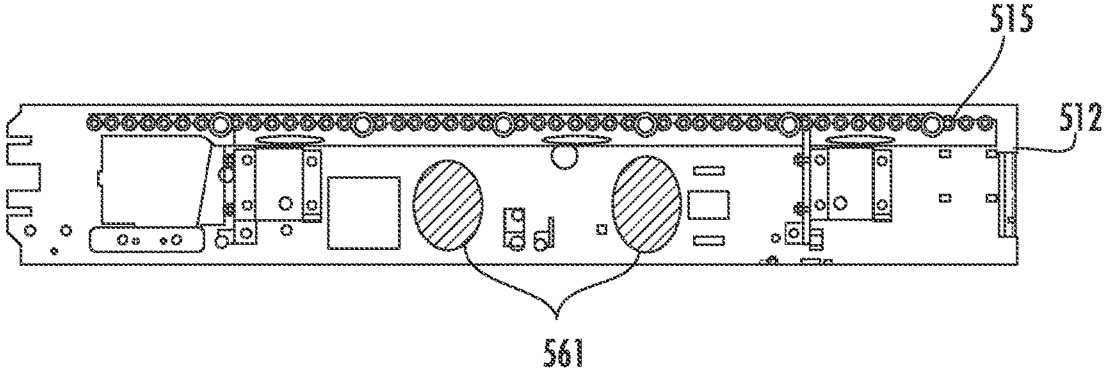
FIG. 15 is a side view of the left-hand side member of the frame of the base of the treadmill of FIG. 14, according to an exemplary embodiment.

With reference to FIGS. 14-15, one or more light sources 561 are coupled to the frame 510 within the base 102, such that the running belt 104, frame 510, side panels 501, 502, and other components cover or shield the light sources 561 when the treadmill 500 is assembled. As shown, the light sources 561 are coupled to the frame 510. In particular, light sources 561 of the first lighting system 560 are coupled to each of the right side member 511, a left side member 512, and each of the cross-members 513. As a result, the light sources 561 effectively outline the base 102 and include illumination sources from the middle area of the base 102 (where the cross-members 513 are positioned/disposed).

In operation, the one or more light sources 561 are structured to emit light 562 from within the base 102 (i.e., within the frame 510, within a perimeter of the running belt 104). Because the light sources 561 are coupled to the cross members 513 and because the running belt 104 is slatted, the light 562 can pass through (e.g., shine through, radiate through, glow through, etc.) the crevices, gaps, or cracks between adjacent slats and on the sides of the belt 104 between the belt 104 and side panels 501, 502 and side members 511 and 512. As the running belt 104 is moving at relatively faster rotational speeds, a user may effectively be able to see within the base 102 due to the light 562 illuminating the cracks between adjacent slats of the running belt. Further, the support surface beneath the base 102 may be illuminated due to no covers or shrouds being positioned underneath the cross-members (between the cross-members and the support surface). In dark use environments, this characteristics is beneficial for users to find the treadmill 500 and for other users to avoid stumbling into the treadmill 500.

Thus, the one or more light sources 561 in the first lighting system lighting 560 emanate, provide, or otherwise discharge light from inside the perimeter of the running belt, which can be directed in any of the 360 degrees. Thus, the one or more light sources 561 mounted inside the frame 510 can shine up, forward, down, back, to the sides, etc.

In other embodiments, one or more light sources 561 may be coupled to different components of the frame 510 or base 102 (e.g., the light sources 561 may be coupled to one or both of the side panels 501 and 502). For example, light sources 561 may only be coupled to the side members, only the cross-members, only one cross-member, only one side member, and/or a combination thereof. Further, the precise placement of the light sources on these components is highly configurable. Additionally, the directional placement of the light sources 561 on these components is also highly configurable. For example, the light sources 561 may oriented towards the support surface for the treadmill 500 in order for the support surface proximate to and around the base 102 to be relatively greatly illuminated as compared to the direction vertically upwards from the support surface (i.e., towards the console 200). Such a configuration may be desirable in order for the light to not be too great that emanates outward and away from the belt 104. Further, the exact number of light sources 561 included in the first lighting system 560 is also highly configurable.

In still some embodiments, holes or apertures may be defined in the side panels 501 and 502. As a result, light sources 561 coupled to the side members 511 and 512 as well the cross-members 513 can emanate light through the side panels and outward and away from the treadmill 500. As mentioned above, the direction of emanation is highly configurable. In this regard, in certain embodiments, one or more reflection devices (e.g., mirror, shiny panel, etc.) and/or lenses may be used to direct the emanated light 562 from the one or more light sources 561 in a variety of desired direction in order to achieve a variety of desired effects.

Figure 12:
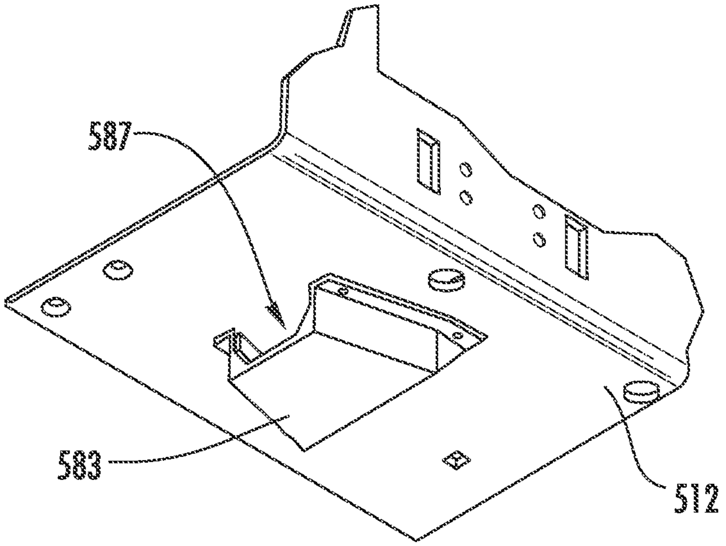
FIG. 12 is a close-up view of the lighting system for the treadmill of FIG. 9, according to an exemplary embodiment.
Figure 13:
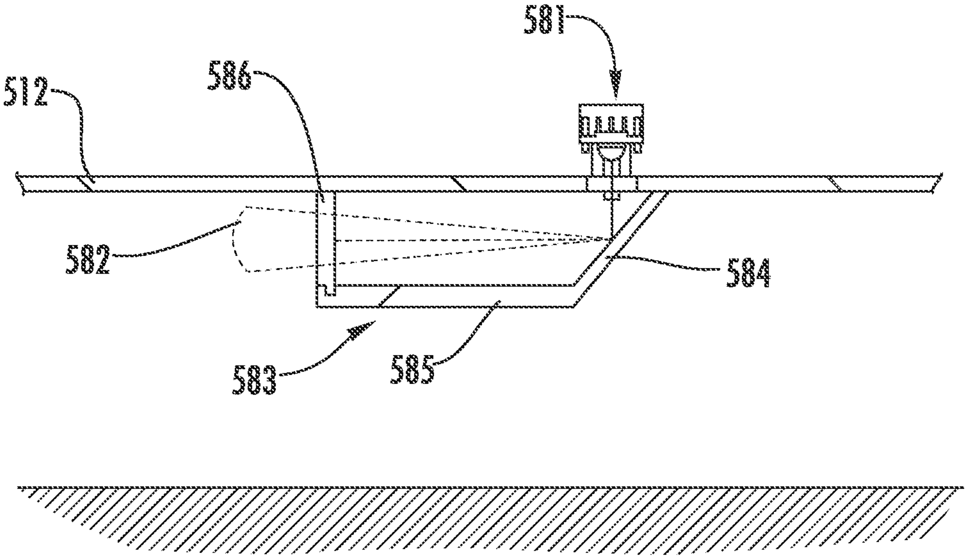
FIG. 13 is a sectional view of the lighting system of FIG. 12 with a lens included therewith, according to an exemplary embodiment.

Turning now to the pair of second lighting systems 580 and primarily to FIGS. 12-13, each lighting system 580 includes a light source 581 that emanates light 582, whereby the light source 581 is coupled to a housing 583 (also referred to as a reflective housing 583) structured to receive and redirect the emanated light 582 from the light source 581. The light sources 581 in each second lighting system 580 are structured as LEDs like the light sources 561. However and like the light sources 561, other configurations of the light sources may also be utilized.

As shown, a light source 581 is coupled to the right side member 511 while a light source 581 is coupled to the left side member 512. In particular, each light source 581 in each lighting system 580 is coupled to a lower panel/bracket of the side members 511 and 512 on the interior surface such that the body of the light source projects upward toward the running belt 104. That is, each light source 581 is positioned interior to the base 102 and the belt 104 (i.e., within the frame 510). In this regard, the lower panel/bracket of each side member 511 and 512 is a barrier or intermediary between the support surface and each light source 581.

Each light source 581 of each lighting system 580 is coupled to the lower panel/bracket of the left and right side members, respectively, in an orthogonal manner facing the support surface. In this regard, each light source 581 is facing or oriented vertically downwards towards the support surface. In other embodiments, the orientation or direction of emanation from the light sources 581 may be different than that depicted.

Each housing 583 in each lighting system 580 is also coupled to the lower panel/bracket of the left and right side members, respectively. However, each housing 583 is coupled to an exterior surface of the lower panel/bracket of the left and right side members 512 and 511, respectively. Thus, each housing 583 is positioned proximate to the support surface and, particularly, between the support surface and the lower panel/bracket of the left and right side members 512, 511 of the frame 510. As a result, each housing 583 is disposed in a substantial parallel arrangement to the support surface. As described below, the housings 583 are configured to direct the light emanated or provided from the light sources 581 in a desired direction.

Because the structure and function of each lighting system 580 is the same, the description provided below is only with respect to the second lighting system 580 that is coupled to the left member 512 as shown in FIGS. 12-13. However, it should be understood that a similar description is applicable with the second lighting system 580 coupled to the right side member 511.

The housing 583 includes a first wall member 584 coupled to the left side member 512 of the frame 510, a second wall member 585 coupled to the first wall member 584 and positioned in a parallel or substantial parallel orientation to the lower panel of the left side member 512 that the first wall member 584 is coupled to, and a lens 586 coupled to each of the second wall member 585 and the side member 512. Collectively, the first wall member 584, second wall member 585, and lens 586 form a receptacle or collector for the provided light 582 from the light source 581. In the depicted embodiment, the first and second wall members 584 may be discrete components that are coupled together (e.g., via one or more fasteners or adhesives). In another embodiment, the first and second wall members 584 and 585 may be of integral or uniform construction. In still another alternative embodiment, the first wall member 584 may be movably coupled to the second wall member 585, which would enable the installer or technician to alter the angle of the first wall member 584 to the structure it is coupled to (e.g., the left side member 512) in order to customize and tailor the direction of the light 582 emitted.

Figure 11:
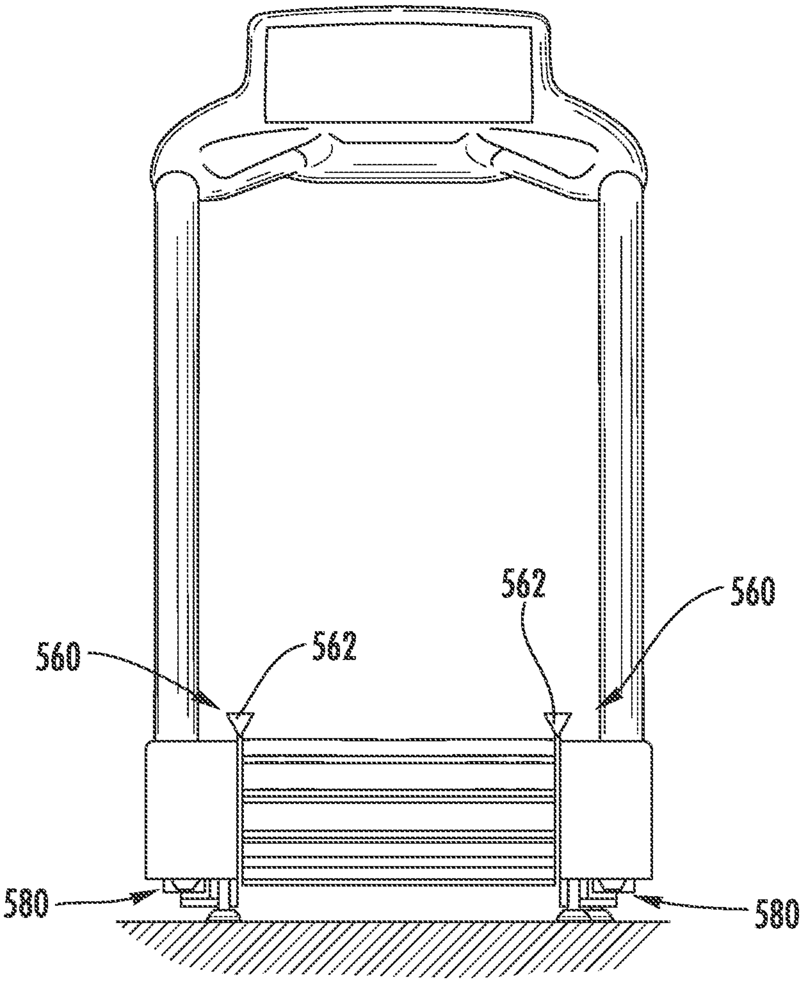
FIG. 11 is forward facing view from the rear of the treadmill of FIG. 9.

As shown, the first wall member 584 extends outward and away from the side member 512 at an angle and towards the support surface, which is shown in FIG. 13 and FIG. 11 to provide a point of reference. The support surface may be a ground surface or other surface used to support the treadmill 500. The first wall member 584 includes a reflective surface that is configured to reflect the beam of light 582 from the light source 581. The reflective surface is disposed proximate to the receptacle and therefore at least partially facing the light source 581 (i.e., the surface that is adjacent to the beam of light 582 emitted from the light source 581 after the light 582 passes through the opening in the left side member 512). In one embodiment and as shown, the first wall member 584 is constructed from metal, such as sheet metal, that is adapted to reflect the light. In another embodiment, a reflective coating may be applied to the first wall member 584. In yet another embodiment, a mirror may be used to reflect the light. In still another embodiment, the surface that reflects the light may be different from the exterior surface (i.e., proximate the support surface). All such configurations are intended to fall within the scope of the present disclosure.

In the example depicted, the lens 586 is structured as a clear acrylic piece of material that is coupled perpendicularly or substantially perpendicularly to the side member 512. The lens 586 may focus the reflected light from the first wall member 584 (e.g., by including curvature with the lens or one or more lenses). The color and tint of the lens is highly configurable in order to achieve a light emitting characteristics (e.g., softer tones, brighter, dulled, etc.). It should be understood that a variety of form factors (e.g., curvatures, shapes, etc.), colors/tints, and materials may be used to construct the lens 586. Accordingly, a variety of light manipulations from the lighting systems 580 is contemplated.

In yet other embodiments, the lens 586 may be omitted such that an opening, shown as opening 587, is created between the second wall member 585 and the side member 512. In this case, no additional light manipulation may be implemented to the emitted light 582 other than that from the light source 581 itself and via the reflective surface (e.g., no change of colors, focusing, brightening, dulling, etc. of the light 582).

Based on the foregoing, operation may be described as follows. The beam of light 582 is emitted from the light source 581 in a first direction (i.e., towards the support surface). The first wall member 584 reflects the light in a second direction, which is different from the first direction. In this example and due to the angle of the first wall member 584 relative to the support surface and side member 512, the beam of light 582 is reflected and directed in a direction parallel to the lower panel/bracket of the side member 512 (based on the view depicted in FIG. 13). As a result, the beam of light 582 is directed through the lens 586 and out towards a rear portion of the treadmill 500 (in a direction away from the console 200). As a result, the light sources 581 and second lighting systems 580 functions to illuminate or glow a rear end of the treadmill 500, which beneficially enables users in dark environments to find the rear part of the treadmill 500 in order to properly board the treadmill 500. Further and due to each lighting system 580 being positioned on each side of the running belt 104, an alley-like glow is created to guide the user to the treadmill 500 and running belt 104.

Beneficially, the positioning of the light sources 581 within the base 102 area and within the frame 510, at least partly, functions to shield the light sources 581 from the external environment thereby protecting them from inadvertent harm. Of course, in other embodiments, the light sources 581 may be positioned outside the frame 510 area (e.g., within the housing 583).

In still other embodiments, the number, location, and orientation of the light sources 581 and housings 583 may change in other configurations. For example, one arrangement may orient the housing 583 in a plane perpendicular to the running belt 104 (i.e., traverse to the longitudinal direction of the running belt 104) such that the light 582 is directed laterally outward from the treadmill 500 (i.e., in a direction substantially perpendicular outward and away from a frontward or rearward direction—towards or away from the console 200, respectively). In another example, the housing 583 may be positioned to orient the light 582 towards the front of the treadmill 500. In yet another example, the light sources 581 and housing 583 may be disposed facing vertically upwards to direct vertically upwards and away from the support surface. Thus, the depiction of the housing 583 and light sources 581 coupled to lower part or bottom of the longitudinal side members 511 and 512 is not meant to be limiting as various other arrangements are intended to fall within the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments and that such variations are intended to be encompassed by the present disclosure.

It is important to note that the constructions and arrangements of the treadmill as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A treadmill, comprising:
- a frame;
- a running belt coupled to the frame, the running belt configured to rotate relative to the frame;
- at least one sensor configured to collect information regarding a rotation of the running belt and a use of the treadmill by a user of the treadmill;
- a console coupled to the frame, the console including a first light source that emits variable light in at least one of a color, a transition characteristic, or a brightness based on the collected information regarding the use of the treadmill by the user; and
- a second light source coupled to the frame and configured to emit a light at least partly away from a front of the treadmill to at least partly illuminate a rear of the treadmill.

2. The treadmill of claim 1, wherein the second light source is coupled to a side of the frame and configured to selectively emit light in a longitudinal direction of the side.

3. The treadmill of claim 1, further comprising:
- a controller coupled to the at least one sensor;
- a display device coupled to the frame, the display device configured to display the collected information regarding the use of the treadmill by the user of the treadmill; and
- a handrail coupled to the frame, wherein the second light source is provided on the handrail.

4. The treadmill of claim 1, wherein at least one of the first or the second light source is configured to provide a visual cue to a non-user of the treadmill regarding the use of the treadmill.

5. The treadmill of claim 1, wherein the second light source is configured to vary a characteristic of the emitted light.

6. The treadmill of claim 5, wherein the characteristic of the emitted light includes at least one of a brightness, a color, or a transition characteristic based on the collected information.

7. The treadmill of claim 6, wherein the characteristic of the emitted light is configured to vary based on a parameter of the collected information being above a threshold.

8. The treadmill of claim 1, wherein the emitted light is configured to selectively illuminate at least one of the treadmill or a relative environment surrounding the treadmill.

9. A treadmill, comprising:
- a frame;
- a running belt coupled to the frame, the running belt configured to rotate relative to the frame;
- at least one sensor configured to collect parameter information regarding a use of the treadmill by a user;
- at least one light source coupled to the frame and configured to selectively illuminate at least one of the treadmill or a relative environment surrounding the treadmill, wherein the illumination of at least one of a color, a transition characteristic, or a brightness of light from the light source is varied based on the collected parameter information; and
- a controller in communication with the at least one light source and a control device associated with an instructor to enable remote control of the at least one light source of the treadmill by the instructor.

10. The treadmill of claim 9, wherein at least one of the at least one light source is configured to illuminate a first color when a parameter of the collected parameter information is below a threshold value and a second color when the parameter of the collected parameter information is above the threshold value.

11. The treadmill of claim 10, wherein the parameter of the collected parameter information includes at least one of a heart rate of the user of the treadmill, a cadence of the user, a distance travelled by the user, an amount of calories burned by the user, a step count of the user, or a speed of the running belt of the treadmill such that the threshold value is at least one of a target heart rate, a target cadence, a target distance, a target amount of calories burnt, a target step count, or a target speed, respectively.

12. The treadmill of claim 9, wherein at least one of the at least one light source is configured to selectively provide illumination outward and at least partly away from a front of the treadmill.

13. The treadmill of claim 9, wherein at least one of the at least one light source is configured to provide the illumination to provide a cue to a non-user of the treadmill regarding the use of the treadmill.

14. The treadmill of claim 13, wherein the cue indicates a speed of the running belt of the treadmill.

15. The treadmill of claim 9, wherein the treadmill is non-motorized.

16. A non-motorized treadmill, comprising:
- a frame;
- a running belt coupled to the frame, the running belt configured to rotate relative to the frame; and
- a plurality of light sources that are each configured to emit a light that varies in at least one of a brightness, a transition characteristic, or a color based on detected parameter information regarding a use of the treadmill;
- wherein at least one of the plurality of light sources is configured to selectively emit the light outward and away from the treadmill to illuminate a rear of the treadmill.

17. The non-motorized treadmill of claim 16, further comprising a display device configured to receive a threshold value for at least one of the detected parameter information, wherein at least one of the plurality of light sources varies the emitted light based on the detected parameter information relative to the threshold value.

18. The non-motorized treadmill of claim 16, wherein at least two of the plurality of light sources are synchronized.

19. The non-motorized treadmill of claim 16, wherein the plurality of light sources includes a first light source and a second light source, and wherein at least one of the first light source or the second light source is configured to selectively emit the light outward and away from the treadmill to illuminate the rear of the treadmill.

* * * * *